United States Patent [19]

Myers, II

[11] Patent Number: 5,456,853

[45] Date of Patent: Oct. 10, 1995

[54] PAINT STRIPPING COMPOSITION BASED ON TETRAHYDROFURFURYL ALCOHOL AND OXYGENATED ALIPHATIC SOLVENTS

[75] Inventor: Marion M. Myers, II, Milwaukee, Wis.

[73] Assignee: Rust-Oleum Corporation, Vernon Hills, Ill.

[21] Appl. No.: 52,578

[22] Filed: Apr. 23, 1993

[51] Int. Cl.$^6$ .............................. C09D 9/00; C11D 7/26; C11D 7/32; C11D 7/50

[52] U.S. Cl. ....................... 252/170; 134/38; 252/153; 252/162; 252/171; 252/542; 252/DIG. 8

[58] Field of Search ....................... 252/162, 170, 252/171, 542, 153, DIG. 8; 134/38

[56] References Cited

U.S. PATENT DOCUMENTS

| | | | |
|---|---|---|---|
| 4,274,884 | 6/1981 | Cartwright | 134/4 |
| 4,366,002 | 12/1982 | Carandang | 134/2 |
| 4,600,522 | 7/1986 | Grzeskowiak, Jr. | 252/170 |
| 4,619,706 | 10/1986 | Squires et al. | 134/2 |
| 4,664,721 | 5/1987 | Valasek | 134/26 |
| 4,737,195 | 4/1988 | Carandang | 134/38 |
| 4,749,510 | 6/1988 | Nelson | 252/166 |
| 4,812,255 | 3/1989 | Suwala | 252/142 |
| 4,923,938 | 5/1990 | Kao et al. | 526/133 |
| 5,015,410 | 5/1991 | Sullivan | 252/166 |
| 5,030,290 | 7/1991 | Davis | 134/4 |
| 5,035,829 | 7/1991 | Suwala | 252/170 |
| 5,049,314 | 9/1991 | Short | 252/542 |
| 5,089,164 | 2/1992 | Stanley | 252/162 |
| 5,098,592 | 3/1992 | Narayanan et al. | 252/162 |
| 5,128,057 | 7/1992 | Bixenman et al. | 252/162 |

FOREIGN PATENT DOCUMENTS

| | | |
|---|---|---|
| 500951 | 9/1992 | European Pat. Off. . |
| 670832 | 7/1989 | Switzerland . |
| 1604391 | 12/1981 | United Kingdom . |

OTHER PUBLICATIONS

Mellan, *Industrial Solvents Handbook* Noyes Data Corp. N.J. 1977, p.521.

QO Chemicals advertisement, American Paint Coatings Journal, p. 9, Aug. 5, 1991.

Developmental Formulation SC-20T analysis, received from author QO Chemicals Aug. 1991.

Developmental Formulation SC-9E analysis, received from author QO Chemicals in Aug. 1991.

*Primary Examiner*—Linda Skaling Therkorn
*Attorney, Agent, or Firm*—Banner & Allegretti, Ltd.

[57] ABSTRACT

Relatively non-toxic and environmentally safe paint stripping compositions are disclosed for use in removing, for example, oil based alkyd and latex paints, varnishes, lacquers, shellacs, enamels, polyurethane and epoxy coatings from wood and metal surfaces at ambient temperatures. It has been unexpectedly found that $C_3$–$C_7$ ether esters and carbonates of the form $R-O-(CH_2)_n-COOR_1$, wherein R and $R_1$ are lower alkyl groups and n=0–2, used in combination with tetrahydrofurfuryl alcohol (THFA) increase the rate of paint removal relative to THFA alone. Other ingredients, such as N-methyl-2-pyrrolidone (NMP), gamma-butyrolactone (BLAC) may be added to improve the efficacy of the present invention without detracting from its other beneficial properties. Additives such as formic acid, surfactant, thickener, corrosion inhibitor, fragrance, and bittering agent may also be added.

13 Claims, No Drawings

5,456,853

PAINT STRIPPING COMPOSITION BASED ON TETRAHYDROFURFURYL ALCOHOL AND OXYGENATED ALIPHATIC SOLVENTS

BACKGROUND OF THE INVENTION

1. Field of the Invention

This invention relates to the field of paint-stripping compositions.

2. Description of the Prior Art

The present invention relates generally to improved compositions for paint stripping. For a number of years methylene chloride was the principal component of paint stripping compositions because of its effectiveness in quickly softening most types of paints. For a number of reasons, however, the use of methylene chloride has become disfavored. Evidence of its toxicity to humans and the environment have caused some to seek alternative formulations.

A number of compounds have been offered as substitutes for methylene chloride. Among the principal compounds that have found to be effective to one degree or another in paint stripping formulations are N-methyl-2-pyrrolidone (NMP), gamma-butyrolactone (BLAC), tetrahydrofurfuryl alcohol (THFA), and furfuryl alcohol (FA). It has also been found that the efficacy of these compounds as paint removers can be improved by using them in combination with one another or with other compounds. For example, FA and THFA have been used in combination (U.S. Pat. No. 4,600, 522). U.S. Pat. No. 4,366,002 teaches the use of two of FA, THFA, and a substituted alcohol of FA or THFA.

Oxygenated aliphatic solvents (e.g., glycols, ethers, esters, alcohols, and organic acids) are among the most frequently found additives used in conjunction with the aforementioned compounds. For example, FA has been used in combination with ethoxytriglycol and ethylene glycol phenyl ether (U.S. Pat. No. 3,551,340); NMP and BLAC in combination with ethyl 3-ethoxypropionate (U.S. Pat. No. 5,098,592); NMP in combination with an oxygenated aliphatic solvents (preferably one of the lower alkyl esters of 3-ethoxypropionate, e.g., ethyl 3-ethoxypropionate), wherein THFA may be substituted for part or all of oxygenated aliphatic solvent (U.S. Pat. No. 5,049,314); and NMP and THFA in combination with a variety of ethers, ketones, alcohols, esters (U.S. Pat. Nos. 4,274,884 and 4,664,721).

Other additives have also been suggested. Amines have been used as accelerators in conjunction with ethoxylated FA, ethoxylated THFA, and NMP (U.S. Pat. No. 4,737,195). Aromatic hydrocarbons (U.S. Pat. No. 4,128,810) and aliphatic hydrocarbons (U.S. Pat. No. 5,015,410) have been used in conjunction with NMP; and organic acids have been used with NMP and BLAC (U.S. Pat. No. 5,035,829). Still others have attempted a two phase system employing glycol phenyl ether, ethoxylated FA, and combinations thereof in an organic phase dispersed in an aqueous phase (U.S. Pat. No. 4,619,706).

Many formulations employing alternatives to methylene chloride suffer from a variety of disadvantages. Those using THFA are preferably used at elevated temperatures on the order of 200° F. because they act too slowly at ambient temperatures. Others are intended for use in baths, where the object to be stripped must be immersed in the bath. Those requiring the use of NMP are expensive due to the relatively high cost of NMP. Furthermore, NMP is derived from non-renewable petroleum sources. Aliphatic dibasic ester based products are too slow and not effective enough. Consequently, it has been desirable to develop an effective paint stripping composition that circumvents these disadvantages without reintroducing the disadvantages posed by methylene chloride paint stripping technology.

SUMMARY OF THE INVENTION

An object of the present invention is to provide a safe and effective paint stripping composition. A further object of the present invention is to provide a paint stripping composition with the following properties: efficacy at ambient temperatures, low flammability, ease of cleaning, water soluble, relatively non-toxic and non-carcinogenic, biodegradable, and environmentally safe. A further object of the present invention is to provide an alternative to NMP in paint stripping compositions that is cheaper, works as quickly and effectively, and is preferably obtained from renewable sources.

It has been known, as disclosed above, that THFA is a useful component in paint stripping compositions. THFA is preferable to NMP in some respects and less desirable in others. It is preferable to NMP because of its lower cost and because it is derived from renewable resources. (THFA is made from FA, which is made from processing corn cobs and oat hulls). It is less desirable than NMP because its rate of action in paint removal is on the order of three to four times slower than NMP at ambient temperatures. THFA shares with NMP the properties of low flammability, ease of cleaning, water solubility, and low toxicity to humans and the environment. It would be desirable, therefore, to accelerate the rate of paint-removal action of THFA without detracting from the aforementioned beneficial properties, thereby providing an attractive substitute for NMP.

It has been unexpectedly discovered that the lower alkyl ether esters and carbonates disclosed herein accomplish this task. In accordance with the present invention, it has been found that $C_3$–$C_7$ ether esters and carbonates of the form R—O—$(CH_2)_n$—COO$R_1$, wherein R and $R_1$ are lower alkyl groups and n=0–2, used in combination with THFA accelerate the rate of paint removal from wood and metal surfaces relative to using THFA alone.

While combinations of THFA and the $C_3$–$C_7$ ether esters or carbonates of the present invention provide a safe and effective paint stripper, addition of other ingredients such as N-methyl-2-pyrrolidone (NMP) and gamma-butyrolactone (BLAC) enhance some of the invention's beneficial properties (e.g., low flammability and rate of performance) without detracting from the other desired properties.

It is also recognized that the paint stripping composition of the present invention may optionally be combined with formic acid as an accelerating agent to remove aged coatings, a surfactant wetting agent, a thickener to aid in application and adherence to vertical surfaces, a corrosion inhibitor to prevent flash rust of metal substrates due to the formic acid, a fragrance to improve the odor, and a bittering agent to prevent ingestion by children. Conventional compounds of these types may be used in combination with the present invention.

DETAILED DESCRIPTION OF THE PREFERRED EMBODIMENTS

A novel feature of the present invention is the combination of tetrahydrofurfuryl alcohol and one or more $C_3$–$C_7$ ether ester and carbonate co-solvents for use as a paint stripping composition. The ether esters and carbonates of the present invention are of the form R—O—$(CH_2)_n$—COO—$R_1$, wherein R and $R_1$ are lower alkyl groups and n=0–2. The preferred ether esters and carbonates are chosen from the group consisting of dimethyl carbonate, diethyl carbonate, methyl methoxy acetate, methyl methoxy propionate, ethyl methoxy acetate, ethyl methoxy propionate, ethyl ethoxy acetate, and methoxy 2-propyl acetate. Particularly preferred ether esters are dimethyl carbonate, diethyl carbonate, methyl methoxy propionate, methyl methoxy acetate, and ethyl methoxy acetate.

Suitable concentrations of the essential components of the present invention are 25–75% by weight THFA and 25–75% by weight of one or more of the preferred ether ester and carbonate co-solvents. All references hereinafter made to percent composition are intended to mean percent by weight.

A number of other commercial additives may be used in combination with THFA and the ether ester carbonate co-solvents. Such commercial additives include formic acid, surfactants, fragrance, thickener, bittering agent, and corrosion inhibitors. Formic acid is used as an accelerating agent for the removal of aged coatings from wood and metal substrates. Formic acid may be included in the stripper formulation preferably in concentrations of 0–10%.

Surfactants are used to give good wetting of the composition to the surface being stripped, help provide good water rinsability once stripping is completed and be biodegradable (if possible) to have a minimum effect on the environment. Non-ionic types are commonly chosen for stripping application. A suitable example of a functional surfactant is the Emulphoghene series of surfactants (Rhone-Poulenc) which are ethoxylates of tridecyl alcohol. The surfactant may be included in the stripper formulation preferably in concentrations of 0– 5%.

A corrosion inhibitor may also be included in the inventive formulation. The corrosion inhibitors that can be used are commonly used as additives for applications with metallic substrates to help prevent flash rusting. The other key requirement is that they be compatible in the stripping composition. Examples of the types that can be used are Petroleum Sulfonates (e.g. Alox 575 from Alox Corporation), mono-, di-, and triethanol amines, and amino methyl propane ("AMP 95" from Angus Chemical). When included in the present formulation, the corrosion inhibitor may be present in concentrations of 0– 5%, and preferably 0–3%.

Thickeners are used in the invention to provide enough viscosity for the formulation to be able to cling to vertical surfaces while stripping paint. While they must be compatible in the formulation, they must also be water soluble and rinsable to have the greatest effectiveness and not to leave a film on the surface being stripped. We have found that the most effective thickeners are of the hydroxypropylcellulose type. These are reaction products of alkali cellulose and proplyene oxide and have a molecular weight of about 1,000,000. Commercial examples of suitable thickeners are "Klucel H"(Aqualon Company) and "Bermocoll OS"(Berol Nobel). When included in the present invention, the thickening agent may be used in concentrations of 0–2%, and preferably 0–1.5%. A bittering agent may be added as a safety precaution against ingestion by children. The bittering agent may be present in concentrations sufficient to confer a bitter taste on the formulation. The preferred concentration of bittering agent is 0–0.005%. The bittering agent preferred for the invention is one commonly used in products that are formulated to deter children from ingesting household chemical products. It's chemical designation is denatonium benzoate. Two examples of commercial names for these products are "Bitrex"(Henley Chemicals Inc.) and "Vilex"(Atomergic Chemetal Corporation).

Fragrances are optional additives that can be used if there is a situation where the odor of the product might be considered to be offensive. This may be the case in formulations that contain formic acid or when stripping is done indoors. There is nothing special about the fragrance used except that it gives the proper level of odor masking and is compatible in the formulation. An example of a suitable fragrance is "Woodland Scent LD 422-1" by J. Manheimer Inc. The fragrance may be present in concentrations of preferably 0–5%.

Of course, the combination of commercial additives described above should be chosen so as not to interfere with the paint stripping qualities of the present invention.

While combinations of THFA and the preferred co-solvents provide a safe and effective paint stripper, addition of other ingredients such as N-methylpyrrolidone (NMP) and gamma-butyrolactone (BLAC) enhance some of the invention's beneficial properties, such as low flammability and speed of performance, but do not detract from other desired properties. When used in the formulation of the present invention, NMP is preferably present in concentrations of 10–40%. When BLAC is present in the invention, the preferred concentrations are 0–40%.

The preferred embodiment of the present invention contains 25–50% THFA, 10–40% of one compound chosen from the group consisting of dimethyl carbonate, diethyl carbonate, methyl methoxy propionate, methyl methoxy acetate, and ethyl methoxy acetate, 10–40% NMP, 0–40% BLAC, 0–10% formic acid, 0–5% surfactant, 1–3% fragrance, 0–1.5% thickener, 0–0.005% bittering agent, and 0–3% corrosion inhibitor and has a viscosity in the range 2,000 to 125,000 centipoise.

The present invention is manufactured by slowly adding thickener to the THFA (and NMP, if used) with agitation until the mixture gels. The remaining ingredients may then be added. The resulting gel is clear and has a viscosity from about 2,000 to 10,000 centipoise, providing good adhesion to horizontal and vertical surfaces. When applied to wood and metal surfaces, the composition of the present invention is effective at ambient temperatures in removing, for example, oil based alkyd and latex paints, varnishes, lacquers, shellacs, enamels, polyurethane and epoxy coatings.

When one of the preferred ether esters or carbonates is used (i.e, dimethyl carbonate, diethyl carbonate, methyl methoxy propionate, methyl methoxy acetate, and ethyl methoxy acetate) in combination with THFA, NMP, and BLAC, the product is an effective paint stripper having a flash point above 140° F. (making them non-flammable) and having little odor.

EXAMPLES

The following examples represent the unexpected performance advantage and synergistic effect of using tetrahydrofurfuryl alcohol and $C_3$–$C_7$ ether ester and carbonate co-solvents for paint removal.

Example 1

Cold rolled steel panels (6"×12") were painted using a medium oil-based alkyd paint (2766 industrial enamel by Rust-Oleum Corporation). In test 1, the coating was approximately 0.7 ml (dry film) in thickness, while in test 2 it was 0.9 ml. Five drops (as applied by eye-dropper) of the mixture to be tested were placed onto the paint film and time to bubbling and lifting of the paint film was recorded. The following table (Table 1) displays the unexpected synergistic results of using a combination of THFA and an ether ester aliphatic co-solvent as a paint stripping composition. These results also show that the solvents dimethyl carbonate, methyl methoxy acetate, methyl methoxy propionate, and ethyl methoxy acetate give the best performance.

TABLE 1

| Solvent | Number of Carbons In Ether Ester Cosolvent | Solvent Alone Test I | Solvent Alone Test II | 50% Solvent with THFA Test I | 50% Solvent with THFA Test II |
|---|---|---|---|---|---|
| THFA | — | 4.4 | 6.8 | 4.4 | 6.8 |
| Methyl Methoxy Acetate | 4 | 1.7 | 2.5 | 1.1 | 1.7 |
| Methyl Methoxy Propionate | 5 | 1.7 | 3.5 | 1.1 | 2.1 |
| Ethyl Methoxy Acetate | 5 | 1.6 | 3.0 | 1.3 | 2.1 |
| Ethyl Methoxy Propionate | 6 | 2.4 | 6.0 | 1.7 | 2.5 |
| Ethyl Ethoxy Acetate | 6 | 3.0 | 6.6 | 1.8 | 2.8 |
| Methoxy 2-Propyl Acetate | 6 | 7.7 | >10 | 2.4 | 3.9 |
| Ethyl Ethoxy Propionate | 7 | >10 | >10 | 2.0 | 3.6 |
| Methoxy Butyl Acetate | 7 | 8.6 | >10 | 2.4 | 4.3 |
| Dimethyl Carbonate | 3 | — | * | — | 2.2 |
| Diethyl Carbonate | 5 | — | >10 | — | 2.7 |

*Sample Evaporated

Example 2

A second series of tests was run using the same test procedures as in example 1, except the formulations for the solvents were: 25 parts THFA, 25 parts NMP, and 50 parts solvent. The results are presented in Table 2.

TABLE 2

| Solvent | Average Strip Time (minutes) |
|---|---|
| Methyl Methoxy Acetate | 1.33 |
| Methyl Methoxy Propionate | 1.50 |
| Ethyl Methoxy Acetate | 1.75 |
| Dimethyl Carbonate | 1.08 |
| Diethyl Carbonate | 1.83 |
| Commercial Products | |
| Woodfinisher's Pride Paint Stripper | 1.83 |
| Magisol (35% NMP) | 2.00 |

What is claimed is:

1. A paint stripping composition comprising 25–75% tetrahydrofurfuryl alcohol and 25–75% of one or more compounds chosen from the group $C_3$–$C_7$ ether ester and carbonate aliphatic co-solvents having the structure R—O—$(CH_2)_n$—COO—$R_1$, wherein R and $R_1$ independently are $C_1$ or $C_2$ alkyl, and n is 0, 1, or 2.

2. A paint stripping composition of claim 1, wherein said $C_3$–$C_7$ ether ester and carbonate aliphatic co-solvents are selected from a group consisting of dimethyl carbonate, diethyl carbonate, methyl methoxy acetate, methyl methoxy propionate, ethyl methoxy acetate, ethyl methoxy propionate, ethyl ethoxy acetate, methoxy 2-propyl acetate.

3. A paint stripping composition of claim 1 containing 0–10% formic acid, 0–5% surfactant, 0–5% fragrance, 0–2% thickener, 0–0.005% bittering agent, and 0–5% corrosion inhibitor wherein an effective amount of at least one of said formic acid, surfactant, fragrance, thickener, bittering agent, or corrosion inhibitor is present.

4. A paint stripping composition of claim 2 containing 0–10% formic acid, 0–5% surfactant, 0–5% fragrance, 0–2% thickener, 0–0.005% by weight bittering agent, and 0–5% corrosion inhibitor wherein an effective amount of at least one of said formic acid, surfactant, fragrance, thickener, bittering agent, or corrosion inhibitor is present.

5. A paint stripping composition of claim 1 containing 10–40% N-methylpyrrolidone and 0–40% gamma-butylrolactone.

6. A paint stripping composition of claim 2 containing 10–40% N-methylpyrrolidone and 0–40% gamma-butylrolactone.

7. A paint stripping composition of claim 3 containing 10–40% N-methylpyrrolidone and 0–40% gamma-butylrolactone.

8. A paint stripping composition of claim 4 containing 10–40% N-methylpyrrolidone and 0–40% gamma-butylrolactone.

9. A method of removing paint from a surface comprising applying an effective amount of the paint stripping composition according to claim 1 to a painted surface.

10. A method of removing paint from a surface comprising applying an effective amount of the paint stripping composition according to claim 2 to a painted surface.

11. A method of removing paint from a surface comprising applying an effective amount of the paint stripping composition according to claim 4 to a painted surface.

12. A method of removing paint from a surface comprising applying an effective amount of the paint stripping composition according to claim 5 to a painted surface.

13. A method of removing paint from a surface comprising applying an effective amount of the paint stripping composition according to claim 8 to a painted surface.

* * * * *